United States Patent
Chida et al.

(10) Patent No.: US 9,822,863 B2
(45) Date of Patent: Nov. 21, 2017

(54) DIFFERENTIAL CASE AND DIFFERENTIAL APPARATUS

(71) Applicant: FUJI JUKOGYO KABUSHIKI KAISHA, Tokyo (JP)

(72) Inventors: Hiroyuki Chida, Tokyo (JP); Yusuke Shirakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/076,949

(22) Filed: Mar. 22, 2016

(65) Prior Publication Data

US 2016/0281832 A1    Sep. 29, 2016

(30) Foreign Application Priority Data

Mar. 27, 2015    (JP) ................................ 2015-065525

(51) Int. Cl.
    *F16H 48/40*    (2012.01)
    *F16H 48/38*    (2012.01)

(52) U.S. Cl.
    CPC ....... *F16H 48/40* (2013.01); *F16H 2048/385* (2013.01)

(58) Field of Classification Search
    CPC .................................. F16H 48/40; F16H 48/08
    See application file for complete search history.

(56) References Cited

U.S. PATENT DOCUMENTS 4,125,026 A    11/1978    Torii et al.

FOREIGN PATENT DOCUMENTS

| JP | 51-004736 | 1/1976 |
|---|---|---|
| JP | S51-066629 | 6/1976 |
| JP | 52-024292 | 6/1977 |
| JP | 54-038027 | 3/1979 |
| JP | H02-097748 | 4/1990 |
| JP | 2005-282817 A | 10/2005 |
| JP | 2010-091046 | 4/2010 |
| JP | 2011-117540 | 6/2011 |

OTHER PUBLICATIONS

Japanese Office Action dated Jul. 19, 2016, in Japanese Patent Application No. 2015-065525(6 pages in Japanese with English translation).
Office Action dated May 9, 2017 in Chinese Patent Application No. 201610160306.2 (Chinese with English translation—12 pages).

*Primary Examiner* — Derek D Knight
(74) *Attorney, Agent, or Firm* — Smith, Gambrell & Russell, LLP

(57) ABSTRACT

A differential case includes: two supported parts so supported that a differential case is rotatable around a central axis of the differential chamber; and a flange provided between the supported parts and projecting in an outer diameter direction, and welded with a ring gear. The flange includes a bearing surface and a rounded base disposed on one side of the differential case in an axial direction. The bearing surface is in contact with a surface, of the ring gear, disposed on opposite side of a tooth surface of the ring gear, and the rounded base is coupled in a continuous fashion to the bearing surface. A rounded part that disperses stress, generated at the rounded base by gear reaction force derived from the ring gear, is provided in a region between the flange and one of the supported parts disposed on the one side.

20 Claims, 2 Drawing Sheets

DIFFERENTIAL CASE AND DIFFERENTIAL APPARATUS

CROSS-REFERENCE TO RELATED APPLICATIONS

The present application claims priority from Japanese Patent Application No. 2015-065525 filed on Mar. 27, 2015, the entire contents of which are hereby incorporated by reference.

BACKGROUND

The technology relates to a differential case and a differential apparatus. In particular, the technology relates to a technique useful in mitigating a concentration of stress generated by gear reaction force at the differential case.

A differential apparatus used for a vehicle is provided with a differential case that houses a differential gear. The differential case is fastened to a ring gear (or a "final driven gear") by a bolt in a typically-employed fixing structure.

In recent years, however, a fixing structure has come into use in which joining by means of welding is used in place of the bolt fastening to address the needs for a reduction in weight and a high mileage of a vehicle. For example, reference is made to Japanese Unexamined Patent Application Publication Nos. 2010-91046 and 2011-117540.

SUMMARY

Simply replacing bolt fastening with welding for a fixing structure of a differential case and a ring gear may result in an excessive concentration of stress at a part of the differential case, namely, at a rounded base of a flange welded to the ring gear.

It is desirable to suitably suppress stress generated at a rounded base of a flange to which a ring gear is welded.

An aspect of the technology provides a differential case that has a differential chamber in which a differential gear mechanism is provided. The differential case includes: two supported parts so supported that the differential case is rotatable around a central axis of the differential chamber; and an annular flange provided between the two supported parts and projecting in an outer diameter direction, and welded with a ring gear concentrically. The outer diameter direction is an outwardly-extending radial direction centered around the central axis of the differential chamber. The flange includes a bearing surface and a rounded base that are disposed on one side of the differential case in an axial direction that is along the central axis of the differential chamber. The bearing surface is in contact with a surface, of the ring gear, disposed on opposite side of a tooth surface of the ring gear. The rounded base is coupled in a continuous fashion to the bearing surface. A rounded part that disperses stress, generated at the rounded base by gear reaction force derived from the ring gear, is provided in a region between the flange and one of the supported parts disposed on the one side.

In one aspect, the rounded part may include two rounded parts that are provided discretely in the region between the flange and the one of the supported parts disposed on the one side.

In one aspect, the rounded part may be provided on an outer periphery of the differential case throughout an entire circumference centered around the central axis.

Another aspect of the technology provides a differential apparatus that includes: the differential case according to any one of the preceding aspects; the ring gear; and two bearings each supporting corresponding one of the two supported parts.

DETAILED DESCRIPTION

In the following, some implementations of the technology are described in detail with reference to the accompanying drawings.

Prior to describing the implementations of the technology, a differential apparatus according to a comparative example be described with reference to FIG. 3.

A differential apparatus used for a vehicle is provided with a differential case that houses a differential gear. The differential case is fastened to a ring gear (or a "final driven gear") by a bolt in a typically-employed fixing structure as illustrated in FIG. 3.

Simply replacing bolt fastening with welding for a fixing structure of a differential case and a ring gear may result in an excessive concentration of stress at a part of the differential case, namely, at a rounded base of a flange welded to the ring gear for the following two factors.

Figure 3:
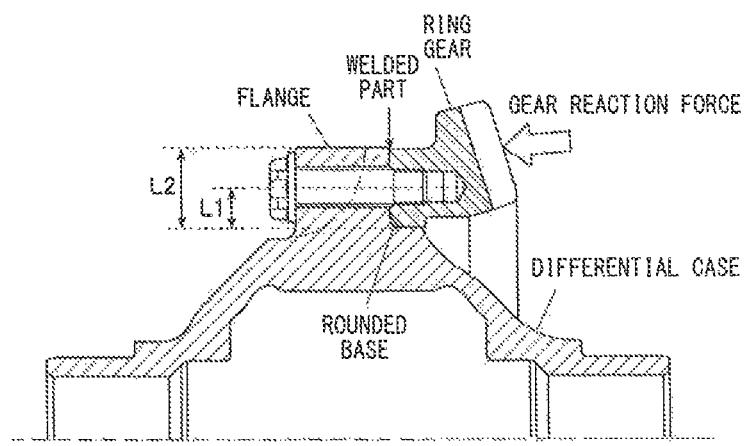
FIG. 3 is a cross-sectional view of a differential apparatus according to a comparative example.

One of the factors is that the point of application of gear reaction force that acts on the flange from the ring gear is shifted toward the outer diameter side of the flange in a case of the welding as compared with a case of the bolt fastening, causing a distance from the rounded base of the flange to the point of application to be increased from L1 to L2 as denoted in FIG. 3. This may result in an increase in a moment load applied to the rounded base upon the acting of the gear reaction force.

Another factor is, in order to suppress tilting of the ring gear toward the flange attributed to thermal contraction upon the welding, the necessity to sufficiently reduce a thickness of the flange as denoted by a two-dot chain line in FIG. 3 as compared with the case of the bolt fastening, for example. This may result in a reduction m strength of the flange against the gear reaction force and an increase in the stress generated at the rounded base accordingly.

The increase in the stress at the rounded base attributable to the two factors mentioned above may be addressed by increasing a size of the rounded base itself, or by replacing a material of the differential case with a high-strength material. However, the measure to increase the size of the rounded base may involve disadvantages including an increase in weight of the differential case and a decrease in length for fitting the ring gear, whereas the measure to employ the high-strength material may incur an increase in costs.

What is therefore desired is a technique that makes it possible to suitably suppress the stress generated at the rounded base without depending on the measures described above.

Figure 1:
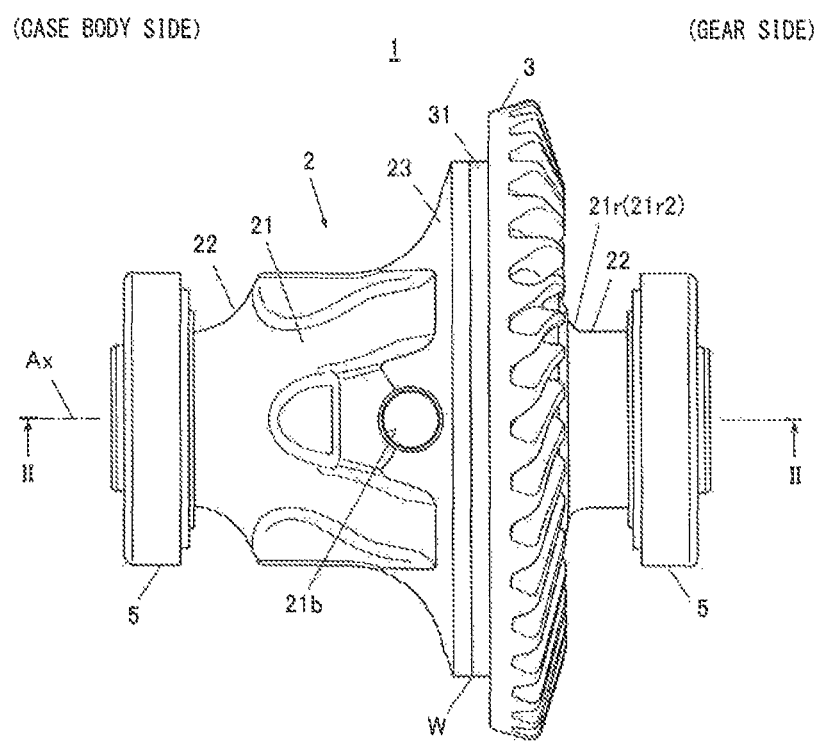
FIG. 1 is a plan view of a differential apparatus according to an implementation.
Figure 2:
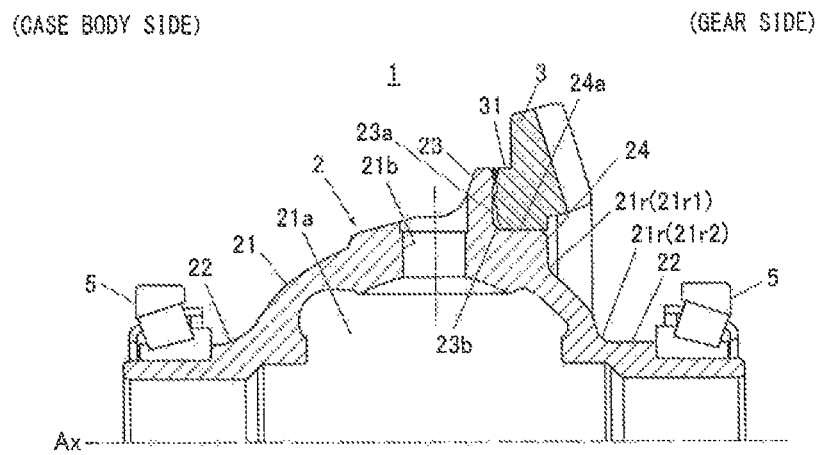
FIG. 2 is a cross-sectional view of the differential apparatus taken along line II-II of FIG. 1.

FIG. 1 is a plan view of a differential apparatus 1 according to an implementation. FIG. 2 is a cross-sectional view of the differential apparatus 1 taken along line of FIG. 1.

The differential apparatus 1 according to the implementation may have a shape substantially rotationally symmetrical about a later-described central axis Ax as an axis of symmetry; accordingly, FIG. 2 illustrates only half of the differential apparatus 1 on one side of the central axis Ax.

Referring to FIGS. 1 and 2, the differential apparatus 1 may be a differential used for a vehicle, and includes a differential case 2 which may be made of a cast iron without limitation.

The differential case 2 may include a hollow case body 21 having a differential chamber 21a. The differential chamber 21a may contain an unillustrated differential gear mechanism of a bevel gear type in which a pair of side gears and a pair of pinion gears are engaged.

The case body 21 may include two substantially-cylindrical extensions 22 and 22 extending, along the substantially horizontal central axis Ax that passes through the center of the differential chamber 21a, from respective innermost diameter regions located on both sides of the case body 21. The extensions 22 and 22 each may have an outer periphery supported by a corresponding bearing 5 which may be a tapered roller bearing, allowing the differential case 2 to be rotatable around the central axis Ax. The extensions 22 and 22 each may have a cylindrical inside region in communication with the differential chamber 21a, allowing an unillustrated drive shaft coupled to the corresponding one of the side gears inside the differential chamber 21a to be inserted through the cylindrical inside region.

The case body 21 may have two bearing holes 21b and 21b (only one of which is illustrated in FIGS. 1 and 2) and unillustrated two lubricant inlets both formed at the center in a direction along the central axis Ax (hereinafter referred to as an "axial direction").

The two bearing holes 21b and 21b may support respective unillustrated shafts of the pinion gears inside the differential chamber 21a, and may be formed in a direction orthogonal to the central axis Ax and allow the inside and the outside of the case body 21 to be in communication with each other.

The two lubricant inlets may serve to introduce a lubricant into the differential chamber 21a from the outside, and may be formed in a direction orthogonal to both the central axis Ax and the direction along the two bearing holes 21b and 21b.

The case body 21 may include a flange 23 and a fitting part 24 on one side of the center in the axial direction (on the right side in FIGS. 1 and 2; hereinafter referred to as "gear side"). The flange 23 may have an annular plate shape. A ring gear 3 or a "final driven gear" is fixed to the flange 23, and may be fitted to the fitting part 24.

The flange 23 is so projected as to flare from the case body 21 in an outer diameter direction (i.e., a radial direction that is centered around the central axis Ax and extends outwardly), and has a surface on the gear side which serves as a gear bearing surface 23a. The gear bearing surface 23a may be substantially orthogonal to the central axis Ax. A rounded base 23b having a predetermined radius is coupled in a continuous fashion to the gear bearing surface 23a on inner diameter side of the gear bearing surface 23a.

The fitting part 24 may be located on the gear side of the flange 23, and coupled in a continuous fashion to the gear bearing surface 23a of the flange 23. More specifically, the fitting part 24 may have an outer periphery 24a that is cylindrical around the central axis Ax and that is coupled in a continuous fashion to the gear bearing surface 23a via the rounded base 23b of the flange 23.

The ring gear 3 has a tooth surface, and may have a stepped part 31 located on opposite side of the tooth surface and having an outer diameter substantially the same as an outer diameter of the flange 23. The ring gear 3 may be so disposed on the case body 21 that an inner periphery of the ring gear 3 is fitted to the outer periphery 24a of the fitting part 24 while allowing the tooth surface to face the gear side, and that an end face of the stepped part 31 is brought into contact with the gear bearing surface 23a. The end face of the stepped part 31 and the gear bearing surface 23a of the flange 23 in contact with each other may be welded throughout an entire circumference in a predetermined weld depth from outer periphery side, fixing the ring gear 3 to the differential case 2 concentrically.

The case body 21 includes two rounded parts 21r, i.e., a first rounded part 21r1 and a second rounded part 21r2, which are formed on an outer periphery of the case body 21 closer to the gear side than the flange 23.

The first rounded part 21r1 may be formed, throughout an entire circumference centered around the central axis Ax, at a part of the case body 21 which is located at a base of the fitting part 21 on the gear side of the fitting part 24. The second rounded part 21r2 may be formed, throughout an entire circumference centered around the central axis Ax, at a part of the case body 21 which is located closer to the gear side and inner diameter side of the case body 21 than the first rounded part 21 r1 and at which the second rounded part 21 r2 is coupled to the extension 22 on the gear side. In other words, the two rounded parts 21r may be provided discretely in a region of the differential case 2 between the flange 23 and the extension 22 on the gear side.

The two rounded parts 21r disperse stress that is generated at the rounded base 23b by gear reaction force that acts on the flange 23 from the ring gear 3.

In the differential case 2, the gear reaction force containing a load component that acts in the axial direction toward opposite side of the gear side (hereinafter referred to as "case body side") may be applied to the flange 23 with the extensions 22 being restrained by their respective bearings 5, resulting in a concentration of the stress attributed to the gear reaction force at the rounded base 23b of the flange 23.

To address this, the differential case 2 in the implementation includes the two rounded parts 21r in the region between the flange 23 and the extension 22 on the gear side. Note that the region is formed smoothly in existing cases. Providing the two rounded parts 21r in the region allows the stress attributed to the gear reaction force to be concentrated at the two rounded parts 21r. As a result, the stress generated at the rounded base 23b, which is closer to the point of application of the gear reaction three than the two rounded parts 21r, of the flange 23 is dispersed to suppress a generation of excessive stress that exceeds strength of the differential case 2.

Note that factors such as, but not limited to, the number, positions, and sizes of the rounded parts 21r are not particularly limited as long as the rounded base 23b of the flange 23 and parts of the differential case 2, including the rounded parts 21r themselves, fall within an allowable range of strength. For example, one or three or more rounded parts 21r may be provided. Also, such one or three or more rounded parts 21r may be provided at an inner periphery of the differential case 2 (or at an inner periphery of the case body 21), for example.

According to the foregoing implementation, one or more rounded parts 21r that disperses the stress generated at the rounded base 23b is provided in the region of the differential case 2 between the flange 23 and the extension 22. The rounded base 23b is coupled in a continuous fashion to the gear bearing surface 23a of the flange 23. The flange 23 is welded with the ring gear 3, and the extension 22 is located on the gear side that corresponds to the side on which the gear bearing surface 23a is provided.

With this configuration, the stress, generated between the flange 23 and the extension 22 on the gear side as a result of the gear reaction force that acts on the flange 23 toward the case body side with the extensions 22 being supported, i.e., restrained by their respective bearings 5, is dispersed by the newly-provided one or more rounded parts 21r. This makes it possible to mitigate the concentration of the stress at the rounded base 23b of the flange 23.

Hence, it is possible to suitably suppress the stress generated at the rounded base 23b of the flange 23 without, for example, increasing a size of the rounded base 23b or using a high-strength material.

Also, two rounded parts 21r may be provided discretely in the region from the flange 23 to the extension 22 on the gear side. This makes it possible to disperse the stress generated between the flange 23 and the extension 22 on the gear side to the rounded parts 21r.

Hence, it is possible to more suitably suppress the stress generated at the rounded base 23b of the flange 23.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A differential case, comprising:
   a body having a differential chamber configured to receive a differential gear mechanism;
   a pair of supported parts between which the body is interposed, the pair of supported parts extending from the body along a central axis that passes through a center of the differential chamber, each of the pair of supported parts configured to be rotatably supported by a corresponding one of a pair of bearings, the pair of supported parts including a first supported part and a second supported part; and
   an annular flange provided between the pair of supported parts in the body and projected to flare in an outer diameter direction, and configured to be concentrically welded with a ring gear that has a tooth surface, the outer diameter direction being an outwardly-extending radial direction centered around the central axis, wherein
   the body comprises a first region between the first supported part and the annular flange and second region between the second supported part and the annular flange,
   the annular flange includes a first face disposed at a side of the first region and a second face disposed opposite to the first face at a side of the second region, the first face comprising a bearing surface and a rounded base, the bearing surface being configured to be in contact with a surface of the ring gear opposite to the tooth surface, and the rounded base being coupled in a continuous fashion to the bearing surface,
   the body includes a first rounded part formed in the first region, the first rounded part being configured to disperse stress generated at the rounded base by gear reaction force derived from the ring gear, and
   the body includes a bearing hole formed in the second region, the bearing hole being configured to support a shaft of a pinion gear.

2. The differential case according to claim 1, wherein the first region comprises the first rounded part and a second rounded part, the first and second rounded parts being provided discretely.

3. The differential case according to claim 2, wherein the first and second rounded parts are provided on an outer periphery of the differential case throughout an entire circumference centered around the central axis.

4. The differential case according to claim 3, further comprising:
   a fitting part comprising an outer periphery that is configuring for fitting with an inner periphery of the ring gear from the side of the first region for disposing the inner periphery of the ring gear between the pair of supported parts on the side of the first region, and
   a curved part having a cross section along the axial direction that projects convexly outward and curves inward as extending toward an outer end of the first region, the curved part being disposed between the fitting part and the first supported part, wherein
   the bearing surface is configured to be welded to the ring gear on an outer diameter side of the bearing surface,
   the rounded base is disposed so as to couple the bearing surface and the outer periphery of the fitting part, and
   the first rounded part has a recessed shape and is disposed so as to couple an inner diameter region of the fitting part on the side of the first region.

5. The differential case according to claim 4, wherein the first rounded part is provided at a first side of the curved part in the axial direction, and the second rounded part is provided at a second side of the curved part in the axial direction.

6. A differential apparatus, comprising:
   the differential case according to claim 4;
   the ring gear; and
   the pair of bearings supporting the pair of supported paxts.

7. A differential apparatus, comprising:
   the differential case according to claim 3;
   the ring gear; and
   the pair of bearings supporting the pair of supported parts.

8. A differential apparatus, comprising:
   the differential case according to claim 2;
   the ring gear; and
   all the pair of bearings supporting the pair of supported parts.

9. The differential case according to claim 2, further comprising:
   a fitting part comprising an outer periphery that is configured for fitting with an inner periphery of the ring gear from the side of the first region for disposing the inner periphery of the ring gear between the pair of supported parts on the side of the first region, and
   a curved part having a cross section along the axial direction that projects convexly outward and curves inward as extending toward an outer end of the first region, the curved part being disposed between the fitting part and the first supported part, wherein
   the bearing surface is configured to be welded to the ring gear on an outer diameter side of the bearing surface,
   the rounded base is disposed so as to couple the bearing surface and the outer periphery of the fitting part, and the first rounded part has a recessed shape and is disposed so as to couple an inner diameter region of the fitting part on the side of the first region.

10. The differential case according to claim 9, wherein the first rounded part is provided at a first side of the curved part in the axial direction, and the second rounded part is provided at a second side of the curved part in the axial direction.

11. A differential apparatus, comprising:
the differential case according to claim 9;
the ring gear; and
the pair of bearings supporting the pair of supported parts.

12. The differential case according to claim 1, wherein the first rounded part is provided on an outer periphery of the differential case throughout an entire circumference centered around the central axis.

13. A differential apparatus, comprising:
the differential case according to claim 12;
the ring gear; and
the pair of bearings supporting the pair of supported parts.

14. The differential case according to claim 12, further comprising:
a fitting part comprising an outer periphery that is configured for fitting with an inner periphery of the ring gear from the side of the first region for disposing the inner periphery of the ring gear between the pair of supported parts on the side of the first region, and
a curved part having a cross section along the axial direction that projects convexly outward and curves inward as extending toward an outer end of the first region, the curved part being disposed between the fitting part and the first supported part, wherein
the bearing surface is configured to be welded to the ring gear on an outer diameter side of the bearing surface,
the rounded base is disposed so as to couple the bearing surface and the outer periphery of the fitting part, and
the first rounded part has a recessed shape and is disposed so as to couple an inner diameter region of the fitting part on the side of the first region.

15. The differential case according to claim 14, wherein the first rounded part is provided at a first side of the curved part in the axial direction, and a second rounded part is provided at a second side of the curved part in the axial direction.

16. A differential apparatus, comprising:
the differential case according to claim 14;
the ring gear; and
the pair of bearings supporting the pair of supported parts.

17. A differential apparatus, comprising:
the differential case according to claim 1;
the ring gear; and
the pair of bearings supporting the pair of supported parts.

18. The differential case according to claim 1, further comprising:
a fitting part comprising an outer periphery that is configured for fitting with an inner periphery of the ring gear from the side of the first region for disposing the inner periphery of the ring gear between the pair of supported parts on the side of the first region, and
a curved part having a cross section along the axial direction that projects convexly outward and curves inward as extending toward an outer end of the first region, the curved part being disposed between the fitting part and the first supported part, wherein
the bearing surface is configured to be welded to the ring gear on an outer diameter side of the bearing surface,
the rounded base is disposed so as to couple the bearing surface and the outer periphery of the fitting part, and
the first rounded part has a recessed shape and is disposed so as to couple an inner diameter region of the fitting part on the side of the first region.

19. The differential case according to claim 18, wherein the first rounded part is provided at a first side of the curved part in the axial direction, and a second rounded part is provided at a second side of the curved part in the axial direction.

20. A differential apparatus, comprising:
the differential case according to claim 18;
the ring gear; and
the pair of bearings supporting the pair of supported part.

* * * * *